United States Patent Office 3,194,314
Patented July 13, 1965

3,194,314
PROCESS OF INHIBITING CORROSION
IN OIL PRODUCTION
Hendrik K. van Poollen, Littleton, Colo., assignor to Marathon Oil Company, Findlay, Ohio, a corporation of Ohio
Filed Nov. 13, 1962, Ser. No. 237,376
The portion of the term of the patent subsequent to Jan. 8, 1980, has been disclaimed
6 Claims. (Cl. 166—42)

My invention relates to a process for ameliorating corrosion problems in the production of petroleum crudes. More particularly, the invention relates to a process wherein a solid corrosion inhibitor is forced into an oil or gas bearing subterranean formation and slowly dissolved within the formation as the crude is withdrawn.

Crude petroleum, often accompanied by water, is pumped from subterranean formations through metal pipes. Once above ground, the crude is pumped through valves and fittings of various types of metal and alloy and stored in metal tanks. Oftentimes the crude and water contain compounds which corrode the metals of the equipment used to obtain and store the petroleum crude from the subterranean formations.

The problem has been alleviated in one process by dropping into the well bore sticks of solid corrosion inhibitors which slowly dissolve in the fluids being pumped from the subterranean formation. This technique is deficient in that metal surfaces which come into contact with the crude before it has contacted the corrosion inhibitor are not protected. A further problem arises in that there is sometimes insufficient mixing of the fluids which have contacted the inhibitor and the remaining fluid to insure uniform corrosion inhibition.

Still another process, called the "inhibitor squeeze" is used. In this process a liquid corrosion inhibitor is forced, without substantial fracturing, into the formation surrounding the well bore. This process is effective for limited periods of time and subject to a more serious disadvantage in that it oil wets the formation adjacent the bore hole. Oil wetness adversely affects the oil-water ratio and thereby decreases recovery efficiency.

I have now discovered that hydraulic fracturing techniques, in which a pressurized fluid is used to fracture a subterranean formation, can be utilized to disperse a solid particulate corrosion inhibitor within a hydrocarbon-bearing formation. As the corrosion inhibitor within the formation dissolves, it is mixed with the crude flowing to the well bore and, by the time the crude reaches the well bore, it is uniformly mixed and superior corrosion inhibition is obtained.

In my copending United States patent application Serial No. 794,255, filed February 19, 1959, now Patent No. 3,072,192 a process is claimed wherein solid inhibitors, mixed with a propping sand and suspended in a fluid carrier, are used to fracture a formation and deposit the inhibitor and fracturing agent within the formation in locations remote to the well bore.

The present invention claimed in my copending application in that I have now discovered that the process works equally well without the presence of a propping sand. A propping agent was first considered necessary to a successful process. It appeared that substantial plugging of the producing formation might occur if the corrosion inhibitor particles were flattened, in the absence of a propping agent, by the weight of the overburden. However, sufficient corrosion inhibitor can be injected into a formation without the necessity for a propping agent to substantially eliminate corrosion problems for substantial periods of time without appreciable plugging of the formation.

A further advantage accrues to a process wherein no propping agent is utilized in that the flattened corrosion inhibitor particles, because of reduced contact area with the formation crudes, dissolve more slowly and thereby give protection for a longer period of time.

In a typical procedure, the particulate inhibitor is suspended in a carrier fluid and pumped, under pressure, into a fractured formation. The pressure is then released at a rate such that the inhibitor remains dispersed within the confines of the fractured area of the formation. In the usual application the corrosion inhibitor-carrier fluid is forced into the formation after a slug of fluid has been injected into the formation at fracturing pressures to fracture the formation and thereby provide fissures through which the corrosion inhibitor can be distributed. In formation which are naturally fractured, this step is not necessary.

Many types of corrosion inhibitors are known which are useful in the process of my invention. Among the inorganic corrosion inhibitors are the dichromates, the nitrites, phosphates, and silicates. Organic inhibitors are usually those containing nitrogen, oxygen, and other elements of Groups V and VI of the Periodic Table. Amines, mercaptans, heterocyclic nitrogen compounds, substituted ureas and thioureas form a group of well-known corrosion inhibitors. Generally, the pelletized solid corrosion inhibitor should have a size range of from a minimum of about 40–60 mesh and a maximum of from about 6–8 mesh. A 20–40 mesh size range is useful in most instances.

The type and quantity of corrosion inhibitor utilized will vary with the size of the fractured area to be filled, the productivity of the well, the types of corrosive materials in the formation fluids, and the types of metals utilized in the production equipment. Depending upon the inhibitor utilized, from 1 to about 100 p.p.m. corrosion inhibitors have been found adequate to accomplish desired results.

The corrosion inhibitor pellets should be practically insoluble in the formation fluids to provide a desired degree of protection over a long period of time as they slowly dissolve within the formation. The inhibitor slowly dissolves in the formation fluids and is utilized at a rate which roughly corresponds to the petroleum production rate, i.e., the substantially insoluble inhibitor dissolves in the petroleum fluids substantially to the extent that unsaturated formation fluids are brought into contact with the inhibitor.

In some instances it will be advantageous to push the inhibitor far into the formation by following the inhibitor-carrier mixture slug with a further carrier slug, thereby allowing substantial mixing of the hydrocarbon which has contacted the inhibitor and uncontacted hydrocarbon as it travels toward the well bore.

From the foregoing description, it will be apparent that this invention may be practiced with a wide selection of chemicals as the inhibitor used and the quantity of inhibitor used may vary substantially according to the requirements of a given treatment. Changes and modifications may be availed of within the spirit and scope of the invention as set forth in the following example and the appended claims.

*Example I*

A well 4717 feet deep produces sour crude at a rate of 112 barrels of liquid per day. The production is from a 30-foot sand formation at about 4690 feet. A total of 130 pounds of 10–20 mesh particles of Corban S–108, a Dowell product, is injected into the formation. Corban S–108 has a melting point of 280° F. and a specific gravity of 2.1. A total of 4000 gallons of lease crude is used as the fracturing and carrier fluid. The Corban S-108 is originally obtained in the form of "sticks" 1½" in diameter by 18" long. The sticks are solid but have a wax-like consistency. In order to crush the sticks, they are cooled, using Dry Ice, which makes them brittle. The cooled sticks are then crushed and screened to separate —20—+10 mesh particles.

The crushed particles are suspended in petroleum crude and, following the injection of a slug of crude, forced into the formation under pressure. The crude pumped from the formation at the completion of the injection has an inhibitor concentration of above 100 p.p.m. initially. At the end of four months, an inhibitor concentration of over 50 p.p.m. is found in the produced crude.

I claim:

1. The process of inhibiting corrosion in crude hydrocarbon production comprising injecting a mixture consisting essentially of solid corrosion inhibitor particles suspended in a carrier material, said carrier material being under pressure sufficient to part the subterranean formation from which crude hydrocarbon is to be produced, into a subterranean hydrocarbon fluid bearing formation through a well drilled therein, said particles being only slightly soluble in the formation fluids; and recovering hydrocarbon fluids from the formation.

2. The process of claim 1 wherein the carrier fluid is a petroleum hydrocarbon and the corrosion inhibitor is of a size ranging from about 40–60 mesh to about 6–8 mesh.

3. The process of claim 1 wherein the corrosion inhibitor is distributed within the formation remote from the injection well by injecting, subsequent to the injection of the suspension of solid corrosion inhibitor particles in the carrier material, additional amounts of carrier material.

4. In a process of inhibiting corrosion of equipment during the production of petroleum fluids from subterranean petroleum-bearing formations through wells drilled therein, the steps consisting of parting said formation by means of fluid pressure, and depositing in fractures in said formations a particulate corrosion inhibitor substantially insoluble in formation fluids.

5. The process for inhibiting corrosion of equipment during the production of petroleum fluids from subterranean petroleum-bearing formations through wells drilled therein, comprising forming a mixture consisting of particulate corrosion inhibitors, substantially insoluble in formation fluids, and a carrier fluid; parting said formation by means of fluid pressure, injecting said mixture into fractures in the said formation, depositing the corrosion inhibitor within the formation, and recovering petroleum fluids therefrom.

6. The process of claim 5 wherein the particulate corrosion inhibitor has a size range of from about 40–60 mesh to about 6–8 mesh.

References Cited by the Examiner

UNITED STATES PATENTS

| | | | |
|---|---|---|---|
| 2,881,837 | 4/59 | Staudt | 166—42.1 |
| 2,950,247 | 8/60 | McGuire et al. | 166—42.1 |
| 3,021,901 | 2/62 | Earlougher | 166—42.1 |
| 3,072,192 | 1/63 | Van Poollen | 166—42.1 |

CHARLES E. O'CONNELL, *Primary Examiner.*